United States Patent
Salter et al.

(10) Patent No.: US 12,083,942 B2
(45) Date of Patent: Sep. 10, 2024

(54) VEHICLE HAMMOCK AND HAMMOCK THERMAL ENERGY CONTROL METHOD

(71) Applicant: Ford Global Technologies, LLC, Dearborn, MI (US)

(72) Inventors: Stuart C. Salter, White Lake, MI (US); David Brian Glickman, Southfield, MI (US); Annette Lynn Huebner, Highland, MI (US); Jeffrey Robert Seaman, Brownstown, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 690 days.

(21) Appl. No.: 17/199,496

(22) Filed: Mar. 12, 2021

(65) Prior Publication Data
US 2022/0289090 A1   Sep. 15, 2022

(51) Int. Cl.
| | |
|---|---|
| *B60N 3/00* | (2006.01) |
| *B60P 3/38* | (2006.01) |
| *B62D 65/14* | (2006.01) |
| *E04H 15/06* | (2006.01) |

(52) U.S. Cl.
CPC .............. *B60N 3/008* (2013.01); *B60P 3/38* (2013.01); *B62D 65/14* (2013.01); *E04H 15/06* (2013.01)

(58) Field of Classification Search
CPC ........... B60N 3/008; B60P 3/38; B62D 65/14; E04H 15/06
USPC ............................................................ 5/119
See application file for complete search history.

(56) References Cited

U.S. PATENT DOCUMENTS

| | | | | | |
|---|---|---|---|---|---|
| 2,348,217 | A | * | 5/1944 | Jones ........................ | A45F 3/22 5/118 |
| 4,729,594 | A | * | 3/1988 | Hoff ........................ | B60P 3/341 296/161 |
| 5,170,521 | A | * | 12/1992 | Light ..................... | A47C 17/84 5/118 |
| 6,467,110 | B1 | * | 10/2002 | Ketcher .................... | A45F 3/24 5/120 |
| 9,101,203 | B2 | | 8/2015 | Ely | |
| 9,505,352 | B2 | * | 11/2016 | Fife ........................... | B60R 7/14 |
| 10,710,487 | B2 | | 7/2020 | Welch et al. | |
| 10,801,231 | B1 | * | 10/2020 | Ensign .................... | E04H 15/12 |

(Continued)

FOREIGN PATENT DOCUMENTS

| | | |
|---|---|---|
| CN | 202106892 | 1/2012 |
| DE | 102007041320 | 3/2009 |

OTHER PUBLICATIONS

Heated Hammock—Mahamac—Hammock ans hanging chair workshop, retrieved from http://www.mahamac.com/fr/en/heated-hammock.html.

(Continued)

*Primary Examiner* — Myles A Throop
(74) *Attorney, Agent, or Firm* — Vichit Chea; Carlson, Gaskey & Olds, P.C.

(57) ABSTRACT

A vehicle assembly includes, among other things, a vehicle hammock and a thermal energy adjustment device of the vehicle hammock. A method of controlling thermal energy within a hammock includes, among other things, providing a vehicle hammock having a thermal energy adjustment device, and adjusting the thermal energy level of the vehicle hammock based, at least in part, on a thermal energy level outside the vehicle hammock.

8 Claims, 3 Drawing Sheets

(56) References Cited

U.S. PATENT DOCUMENTS

| | | | |
|---|---|---|---|
| 2015/0173496 A1* | 6/2015 | Ely | B60N 3/008 |
| | | | 5/118 |
| 2016/0136385 A1* | 5/2016 | Scorcioni | A61B 5/4812 |
| | | | 600/26 |
| 2016/0270993 A1* | 9/2016 | Wilden | A61G 11/00 |
| 2017/0127807 A1* | 5/2017 | Lindberg | A45F 3/22 |
| 2019/0118625 A1* | 4/2019 | Tate | E05D 15/101 |
| 2019/0275952 A1* | 9/2019 | Bennett | B60R 11/00 |
| 2021/0162929 A1* | 6/2021 | Stahl | B60N 3/008 |
| 2022/0111700 A1* | 4/2022 | Henderson | B60H 1/00364 |

OTHER PUBLICATIONS

The Only Heated Hammock—Hammacher Schlemmer, retrieved from https://www.hammacher.com/product/only-heated-hammock.

* cited by examiner

VEHICLE HAMMOCK AND HAMMOCK THERMAL ENERGY CONTROL METHOD

TECHNICAL FIELD

This disclosure relates generally to a vehicle hammock and, more particularly, to a vehicle hammock that can be heated, cooled, or both.

BACKGROUND

Motor vehicles are often used to transport passengers and cargo. From time to time, a user may rest or sleep within their vehicle.

SUMMARY

A vehicle assembly according to an exemplary aspect of the present disclosure includes, among other things, a vehicle hammock and a thermal energy adjustment device of the vehicle hammock.

In another example of the foregoing vehicle assembly, the thermal energy adjustment device is a heater.

In another exemplary embodiment of any of the foregoing vehicle assemblies, the thermal energy adjustment device is a chiller.

A further example of any of the foregoing vehicle assemblies includes a control module configured to adjust a thermal energy level of the vehicle hammock using the thermal energy adjustment device.

In a further example of any of the foregoing vehicle assemblies, the control module is configured to adjust the thermal energy level of the vehicle hammock based in part on a thermal energy level outside the vehicle hammock.

In a further example of any of the foregoing assemblies, the vehicle hammock is hanging within a passenger compartment of the vehicle. The thermal energy level outside the hammock is a thermal energy level within the passenger compartment.

In a further example of any of the foregoing vehicle assemblies, the vehicle hammock is supported by at least one rail of the vehicle when the vehicle hammock is hanging within the passenger compartment.

In another example of any of the foregoing assemblies, the vehicle hammock is supported by at least one rail of the vehicle when the vehicle hammock is hanging against a side of the vehicle.

Another example of any of the foregoing vehicle assemblies includes a frame of the vehicle hammock and at least one door hinge assembly of the vehicle. The frame is configured to engage the door hinge assembly when the vehicle hammock is hanging against the side of vehicle such that the vehicle hammock is at least partially supported by the door hinge assembly.

Another example of any of the foregoing vehicle assemblies includes a removable side door of the vehicle. The removable side door is in a removed position when the frame is engaging the at least one door hinge assembly. The door hinge assembly pivotably couples the removable side door to a body of the vehicle when the removable side door is in an installed position.

A method of controlling thermal energy within a hammock according to another exemplary aspect of the present disclosure includes, among other things, providing a vehicle hammock having a thermal energy adjustment device, and adjusting the thermal energy level of the vehicle hammock based, at least in part, on a thermal energy level outside the vehicle hammock.

Another example of the foregoing method includes hanging the vehicle hammock within a passenger compartment of a vehicle.

In another example of the foregoing method, the vehicle hammock is supported by at least one rail of the vehicle when the vehicle hammock is hanging within the passenger compartment.

Another example of any of the foregoing methods includes hanging the vehicle hammock against the side of the vehicle.

In another example of any of the foregoing methods, the vehicle hammock is supported by at least one rail of the vehicle when the vehicle hammock is hanging against the side of the vehicle.

Another example of any of the foregoing methods includes at least partially supporting the vehicle hammock with a hinge assembly of the vehicle when the hammock is hanging against the side of the vehicle.

In another example of any of the foregoing methods, the hinge assembly comprises a side door hinge assembly.

In another example of any of the foregoing methods, the vehicle energy adjustment device is a heater of the vehicle hammock.

In another example of any of the foregoing methods, the vehicle energy adjustment device is a chiller of the vehicle hammock.

Another example of any of the foregoing methods includes powering the thermal energy adjustment device using a power source of the vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
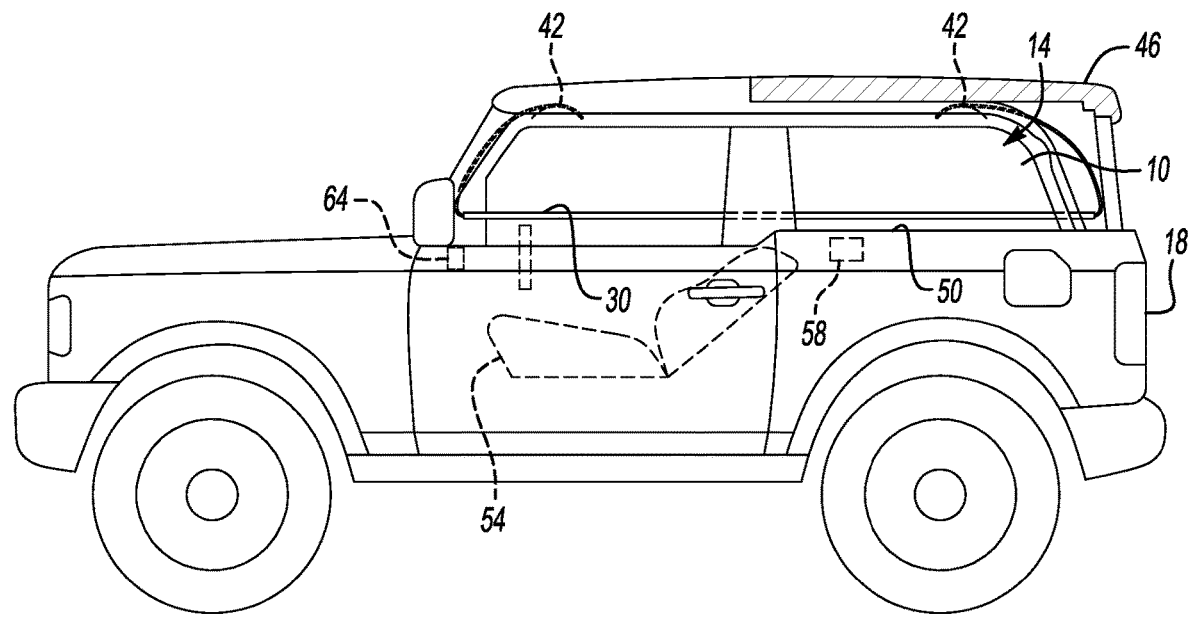
FIG. 1 illustrates a side view of a vehicle hammock in a deployed position within a vehicle.

This disclosure relates generally to a vehicle hammock. In particular, the disclosure is directed toward a vehicle hammock that can be heated, cooled, or both in response to a thermal energy condition outside the vehicle hammock.

For example, if the vehicle hammock is hanging within a passenger compartment of the vehicle, the vehicle hammock can heat up automatically if a temperature within the passenger compartment falls below a threshold level. While the vehicle includes an HVAC system to control thermal energy levels in the passenger compartment, heating the vehicle hammock can occur instead of heating the passenger compartment with HVAC system.

With reference to the exemplary embodiment shown in FIGS. 1-4, a vehicle hammock 10 can hang within a passenger compartment 14 of a vehicle 18. The vehicle hammock 10, in the exemplary embodiment, includes a first attachment assembly 22, a second attachment assembly 26, a support mat 30, a connector 34, a thermal energy adjustment device 38, and a controller 44.

Figure 2:
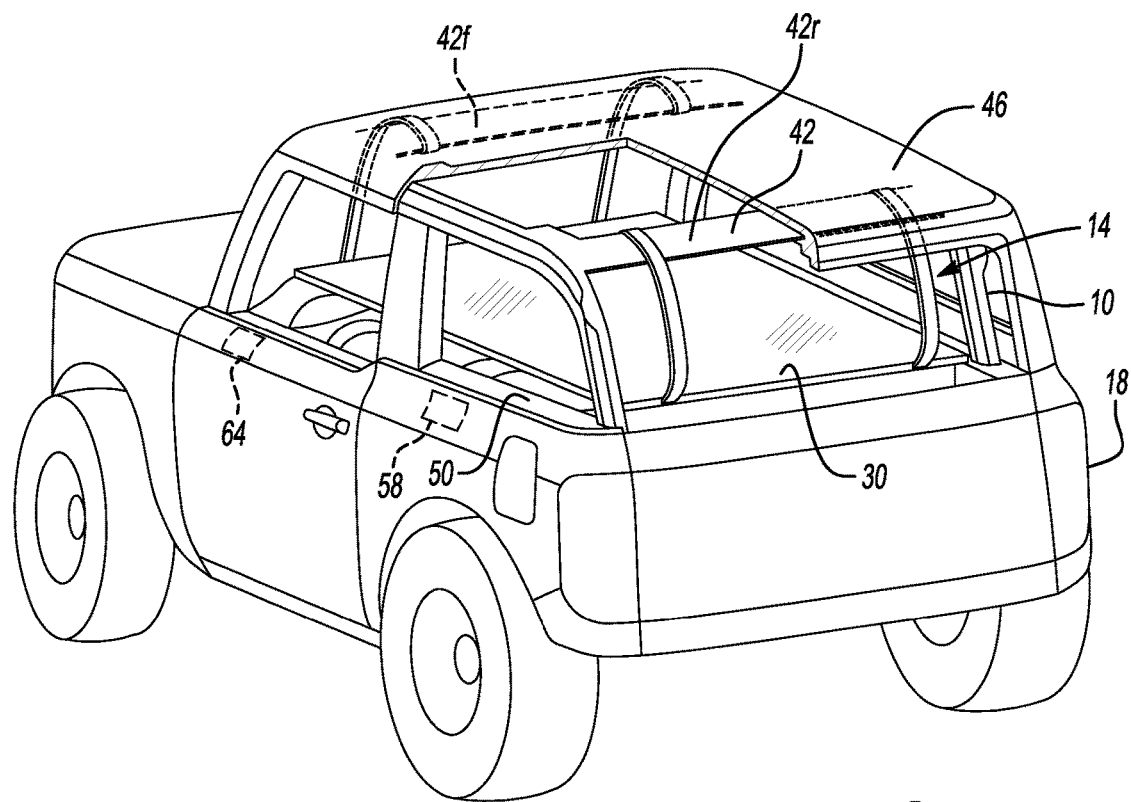
FIG. 2 illustrates a perspective view of the vehicle and the vehicle hammock of FIG. 1.

The attachment assemblies 22 and 26 can hang from rails 42 of the vehicle 18 when the vehicle hammock 10 is in the deployed position of FIGS. 1 and 2. A person having skill in this art and the benefit of this disclosure could understand how to connect attachment assemblies to rails.

In this embodiment, the attachment assembly 22 is a strap that is tied to a forward cross-car rail 42F, and the attachment assembly 26 is a strap that is tied to a rearward cross-car rail 42R. In other examples, the attachment assemblies 22 and 26 could be looped around the rails 42 and secured using hook-and-loop fasteners. In other examples, the attachment assemblies 22 and 26 could be hooked to the rails 42.

The attachment assemblies 22 and 26 could be woven fabric straps, or could be relatively rigid support members for example.

The attachment assemblies 22 and 26 can connect to the rails 42 when a top 46 is on the vehicle 18, or when the top 46 is off the vehicle 18.

When the attachment assemblies 22,26 are hung from the rails 42, the support mat 30 is suspended within the passenger compartment 14 at a position approximately vertically aligned with a beltline 50 of the vehicle. Seats 54 of the vehicle 18 can be reclined, as shown in FIG. 1, so the seats 54 do not interfere with the support mat 30.

A user can rest on the support mat 30 when the vehicle hammock 10 is in the position of FIGS. 1 and 2. The vehicle hammock 10 is designed for a single user. In other examples, a width of the support mat 30 is increased so that the vehicle hammock 10 can accommodate more than one user.

When in the deployed position of FIGS. 1 and 2, the connector 34 can operatively couple to a connector of the vehicle 18. The vehicle hammock 10 can be powered by a power source of the vehicle 18 through the connector 34. In another example, the vehicle hammock 10 can be powered instead or additionally by batteries of the vehicle hammock 10.

The connector 34, in the exemplary embodiment, is also configured to communicate data between the vehicle 18 and the vehicle hammock 10, particularly the controller 44 of the vehicle hammock 10. Information communicated to the controller 44 from the vehicle 18 can include information collected by a temperature sensor 58 of the vehicle 18. The temperature sensor 58 can sense a temperature within the passenger compartment 14.

In some examples, the controller 44 of the vehicle hammock 10 communicates wirelessly with the vehicle 18 via low power wireless communication technologies like Bluetooth Low Energy.

If data collected by the temperature sensor 58 indicates that the passenger compartment 14 is relatively cold, the controller 44 may automatically adjust the thermal energy adjustment device 38, which is a heater in this example, to activate to adjust thermal energy within the vehicle hammock 10 by increasing the amount of thermal energy within the vehicle hammock 10. A user resting on the support mat 30 is warmed by thermal energy generated from the thermal energy adjustment device 38 within the support mat 30. The thermal energy adjustment device can include, for example, carbon fiber heating elements sewn into a surface of the support mat 30.

Since the user is warmed by the vehicle hammock 10, the vehicle 18 does not need to activate an HVAC system 62 of the vehicle 18 to warm the passenger compartment 14, or at least does not need to activate the HVAC system 62 as long as would be required if the user were not warmed by the vehicle 18. This can conserve power when compared to heating the passenger compartment 14 using the HVAC system 62.

In another example, the thermal energy adjustment device 38 of the vehicle hammock 10 is instead or additionally a chiller, which can be similar to chillers used in automotive seats. If the sensor 58 detects an uncomfortably high temperature within the passenger compartment 14, the controller 44 may automatically adjust the thermal energy adjustment device 38 to cool the support mat of the vehicle hammock 10 thereby comforting the user resting on the vehicle hammock 10.

Associating the thermal level of the vehicle hammock 10 with the HVAC system 62 can help to ensure that, as the temperature inside the vehicle 18 drops, more thermal energy is supplied to the vehicle hammock 10 so the user can rest comfortably in the vehicle hammock 10. The amount of adjustment for a given temperature inside the passenger compartment 14 can be obtained by the controller 44 from a lookup table stored in a memory.

In some examples, the vehicle 18 can include an interior occupancy sensor 64. This can be used to confirm that the user is utilizing the vehicle hammock 10 prior to adjusting the thermal energy adjustment device 38. The interior occupancy sensor 64 can be an ultrasonic-based detection sensor, for example. The interior occupancy sensor 64 can monitor for movement that indicates the presence of the user. The interior occupancy sensor 64 could, in another example, rely on strain gages that monitor loads on the attachment assemblies 22 and 26. Increased strain can indicate that a user is resting in the vehicle hammock 10.

In some examples, features of the vehicle 18 can be adjusted based on the user occupying the vehicle hammock 10. For example, when movements are detected indicating that the user is exiting the vehicle hammock 10, the ambient lights of the vehicle 18 may be turned on to act as a night lights. Normal door ajar enabled and map/dome lights can be disabled or dimmed to act as ambient lights. Windows of the vehicle 18 can be tied to rain sensor. If rain is detected, the windows will roll up, but remain partially open, to keep rain out while providing ventilation to the user within the vehicle hammock 10.

Figure 3:
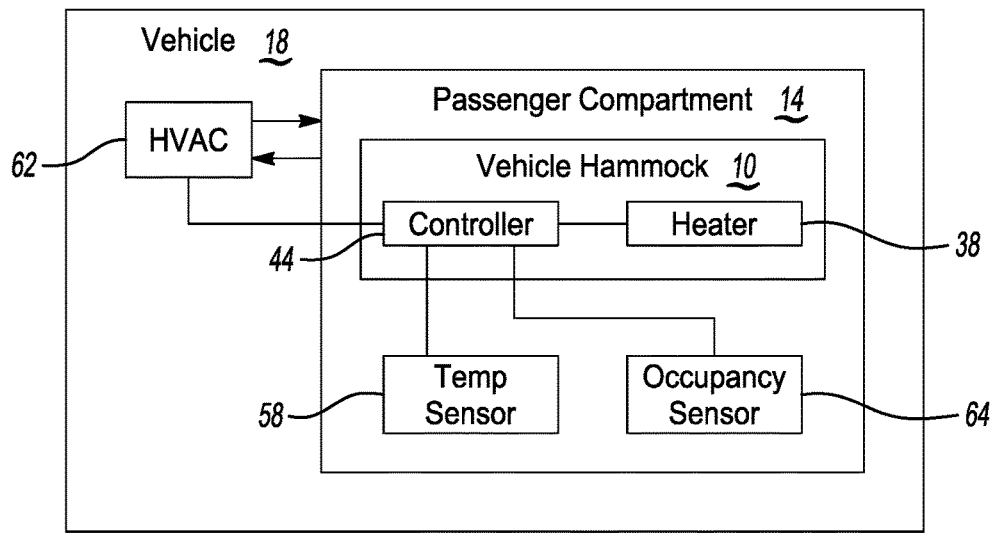
FIG. 3 illustrates a highly schematic view of the vehicle and vehicle hammock of FIGS. 1 and 2.
Figure 4:
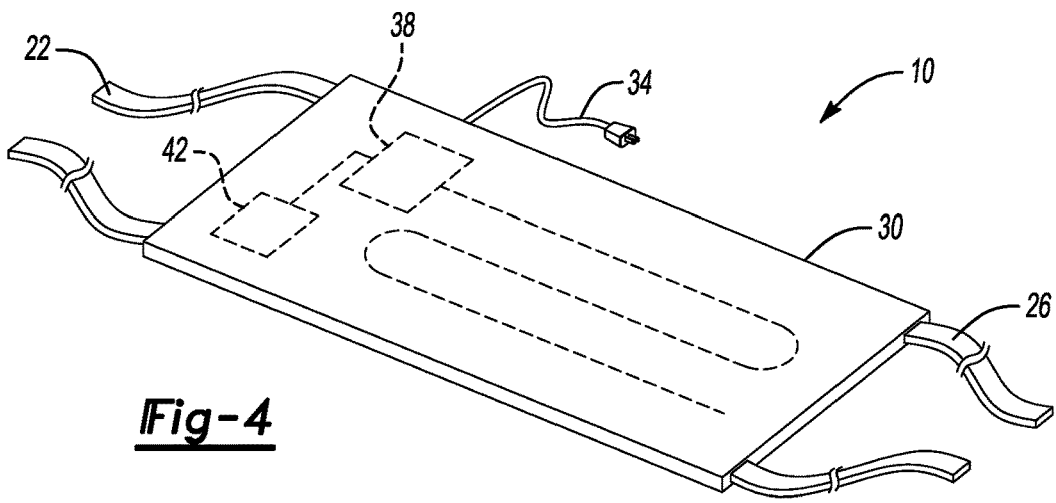
FIG. 4 illustrates the vehicle hammock of FIGS. 1 and 2.
Figure 5:
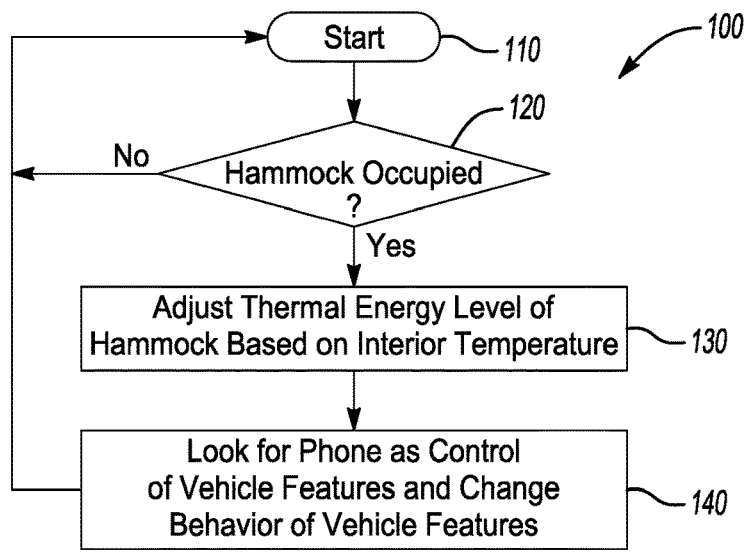
FIG. 5 illustrates a flow of a method of controlling the vehicle hammock of FIGS. 1-4.

With reference now to FIG. 5 and continuing reference to FIGS. 3 and 4, a flow of an example method 100 utilized by the controller 44 can begin at a step 110. The method 100 then moves to a step 120 which assesses whether or not the vehicle hammock 10 is occupied by a user. A motion sensor, camera, or another type of sensing device can be utilized to assess whether or not a user is resting on the support mat 30 of the vehicle hammock 10.

If not, the method 100 returns to the start 110. If the method 100 assesses that the vehicle hammock 10 is occupied at the step 120, the method moves to the step 130, which adjusts a thermal energy level of the vehicle hammock 10 based on a temperature outside the vehicle hammock 10—here a temperature of the passenger compartment 14 that is sensed by the sensor 58.

The method 100 then moves to step 140 which looks for a phone of the user as a controller of features of the vehicle 18. The user can then control, for example, a radio of the vehicle 18 utilizing the user's smartphone rather than interfacing directly with a human machine interface of the vehicle 18. Since the user is resting within the vehicle hammock 10, access to the human machine interface of the vehicle may be impeded. For at least this reason, the user may desire the control option where the user is able to control features of the vehicle 18 through their smartphone. In some examples, through the smartphone or smart device, the user can adjust the thermal energy emitted by the vehicle hammock 10, windows of the vehicle 18, and audio/video playback within the vehicle 18.

Figure 6:
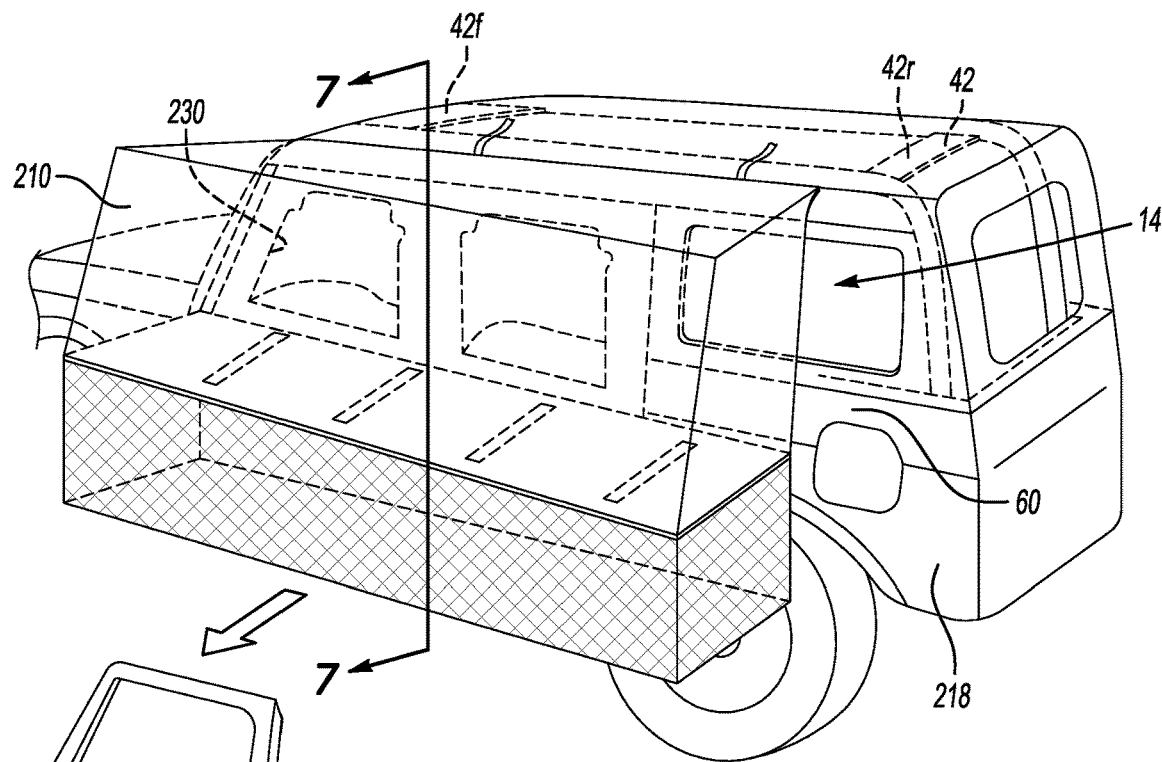
FIG. 6 illustrates the vehicle of FIGS. 1 and 2, and a vehicle hammock according to another exemplary aspect of the present disclosure.
Figure 7:
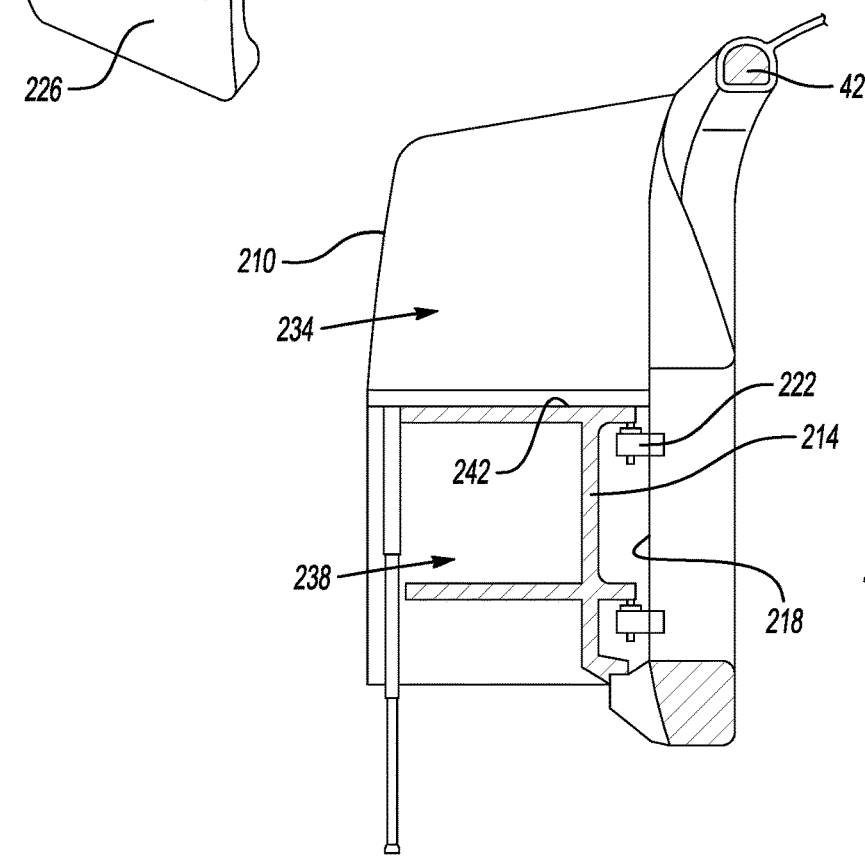
FIG. 7 illustrates a section view taken at line 7-7 in FIG. 6.

With reference now to FIGS. 6 and 7, another example vehicle hammock 210 is supported by the rails 42 of the vehicle 18. The vehicle hammock 210 is hanging from the rails and is positioned against a laterally facing side 60 of the vehicle 18. That is, the vehicle hammock 210 is outside the passenger compartment 14 of the vehicle 18. This configuration—the vehicle hammock 210 outside the passenger compartment 14—can be useful if the user is utilizing the passenger compartment 14 to store gear, for example. The rails 42 can support the vehicle hammock 210 when the top 46 is on the vehicle 18 or when the top 46 is off as shown in FIGS. 6 and 7.

The vehicle hammock 210 can be an assembly including a frame 214 and a tent portion 218. When the hammock 210 is in the deployed position of FIGS. 6 and 7, the frame can engage a door hinge 222 of the vehicle 18. The frame 214 of the vehicle hammock 210 is at least partially supported by the hinges 222 of the vehicle 18.

The vehicle 18 includes removable side doors one of which is shown as side door 226 in FIG. 6. The side door 226 in FIG. 6 is shown in a position where the side door 226 has been removed from to the portions of the vehicle 18.

The vehicle hammock 210 connects to the vehicle 18 when the side door 226 is in the removed position shown. The vehicle hammock 210 can include pockets 230 that project into the passenger compartment 14, which can increase a storage availability for a user within the vehicle hammock 210.

The example vehicle hammock 210 includes an upper region 234 and lower region 238. A platform 242 of the frame 214 separates the upper region 234 from the lower area 238. Portions of the vehicle hammock 210 vertically beneath the platform 242 can be mesh. Gear and pets can be stored within the lower region 238 while a user can occupy the upper region 234. The weight of the user is supported on the platform 242 of the frame 214 when the user is occupying the upper region 234.

The vehicle hammock 210 can, like the vehicle hammock 10 of FIGS. 1-4, include a thermal energy adjustment device. The device can be adjacent or imbedded within the platform 242. A controller of the vehicle hammock 10 can collect information about thermal energy levels outside the vehicle hammock 210. The controller of the vehicle hammock 210 can then automatically adjust the thermal energy adjustment device to provide a desired thermal energy level within the vehicle hammock upper region 234, or lower region 238, or both.

The method may rely on a lookup table to assess how much of an adjustment to be made to the thermal energy adjustment device in response to information from about thermal energy levels outside the vehicle hammock.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:
   a vehicle hammock;
   a thermal energy adjustment device of the vehicle hammock, wherein the vehicle hammock is supported by at least one rail of a vehicle when the vehicle hammock is outside a passenger compartment of the vehicle and hanging against a side of the vehicle;
   a frame of the vehicle hammock and at least one door hinge assembly of the vehicle, the frame configured to engage the at least one door hinge assembly when the vehicle hammock is hanging against the side of the vehicle such that the vehicle hammock is at least partially supported by the at least one door hinge assembly; and
   a removable side door of the vehicle, the removable side door is in a removed position when the frame is engaging the at least one door hinge assembly, the at least one door hinge assembly pivotably coupling the removable side door to a body of the vehicle when the removable side door is in an installed position.

2. The vehicle assembly of claim 1, wherein the thermal energy adjustment device is a heater within a support mat of the vehicle hammock.

3. The vehicle assembly of claim 1, wherein the thermal energy adjustment device is a chiller within a support mat of the vehicle hammock.

4. The vehicle assembly of claim 1, further comprising a control module configured to adjust a thermal energy level of the vehicle hammock using the thermal energy adjustment device, wherein the control module is configured to adjust the thermal energy level of the vehicle hammock based in part on a thermal energy level within an area of a passenger compartment of a vehicle that is outside the vehicle hammock.

5. The vehicle assembly of claim 1, further comprising a control module configured to adjust a thermal energy level of the vehicle hammock using the thermal energy adjustment device, wherein vehicle hammock is hanging within a passenger compartment of a vehicle, the control module configured to adjust the thermal energy level of the vehicle hammock based in part on the thermal energy level outside the vehicle hammock and within the passenger compartment.

6. The vehicle assembly of claim 5, wherein the vehicle hammock is supported by at least one rail of the vehicle when the vehicle hammock is hanging within the passenger compartment.

7. The vehicle assembly of claim 1, wherein the vehicle hammock is supported by at least one rail of a vehicle when the vehicle hammock is outside a passenger compartment of the vehicle and hanging against a side of the vehicle.

8. The vehicle assembly of claim 7, further comprising a frame of the vehicle hammock and at least one door hinge assembly of the vehicle, the frame configured to engage the at least one door hinge assembly when the vehicle hammock is hanging against the side of the vehicle such that the vehicle hammock is at least partially supported by the at least one door hinge assembly.

* * * * *